(12) United States Patent
Gosau et al.

(10) Patent No.: US 11,090,841 B2
(45) Date of Patent: Aug. 17, 2021

(54) RECYCLING OF POLYMER MATRIX COMPOSITE

(71) Applicant: Composite Tech Holdings Limited, London (GB)

(72) Inventors: Jan-Michael Gosau, Albuquerque, NM (US); Ronald E. Allred, Albuquerque, NM (US)

(73) Assignee: Composite Tech Holdings Limited, London (GB)

( * ) Notice: Subject to any disclaimer, the term of this patent is extended or adjusted under 35 U.S.C. 154(b) by 199 days.

(21) Appl. No.: 16/076,980

(22) PCT Filed: Mar. 31, 2017

(86) PCT No.: PCT/IB2017/051838
§ 371 (c)(1),
(2) Date: Aug. 9, 2018

(87) PCT Pub. No.: WO2017/175100
PCT Pub. Date: Oct. 12, 2017

(65) Prior Publication Data
US 2019/0047181 A1 Feb. 14, 2019

Related U.S. Application Data

(60) Provisional application No. 62/318,555, filed on Apr. 5, 2016.

(51) Int. Cl.
| | | |
|---|---|---|
| *B29B 17/02* | (2006.01) | |
| *C08J 11/08* | (2006.01) | |
| *C08J 11/24* | (2006.01) | |
| *C08J 11/10* | (2006.01) | |
| *C08J 11/16* | (2006.01) | |
| *C08J 11/18* | (2006.01) | |
| *C01B 32/05* | (2017.01) | |
| *B29K 307/04* | (2006.01) | |

(52) U.S. Cl.
CPC .............. *B29B 17/02* (2013.01); *C01B 32/05* (2017.08); *C08J 11/08* (2013.01); *C08J 11/10* (2013.01); *C08J 11/16* (2013.01); *C08J 11/18* (2013.01); *C08J 11/24* (2013.01); *B29B 2017/0293* (2013.01); *B29K 2307/04* (2013.01); *C08J 2300/24* (2013.01); *C08J 2363/00* (2013.01); *Y02W 30/62* (2015.05)

(58) Field of Classification Search
CPC .. B29B 17/02; B29B 2017/0293; C08J 11/08; C08J 11/24; C08J 11/10; C08J 11/16; C08J 11/18; C08J 2363/00; C08J 2300/24; C01B 32/05; Y02W 30/62; B29K 2307/04
See application file for complete search history.

(56) References Cited

U.S. PATENT DOCUMENTS

2011/0133133 A1* 6/2011 Fischer ................... C08K 7/24
252/510

FOREIGN PATENT DOCUMENTS

| CN | 101928406 A | 12/2010 | |
|---|---|---|---|
| CN | 102558603 A * | 1/2012 | ............. C08J 11/14 |
| CN | 102391543 A | 3/2012 | |
| CN | 102558603 A | 7/2012 | |
| JP | H08269227 A | 10/1996 | |
| JP | 2006-124480 A | 5/2006 | |
| JP | 2015189850 A | 11/2015 | |
| WO | WO-2014169846 A1 | 10/2014 | |
| WO | WO-2014169847 A1 | 10/2014 | |
| WO | WO-2014/179939 A1 | 11/2014 | |
| WO | WO 2016/095817 * | 6/2016 | ............. B32B 27/06 |
| WO | WO-2016095817 A1 | 6/2016 | |

OTHER PUBLICATIONS

Machine Translation of CN 102558603A to Univ. Tongji (Year: 2012).*
International Preliminary Report on Patentability for International Application No. PCT/IB2017/051838 dated Aug. 6, 2018.
Liu et al., "Chemical recycling of carbon fibre reinforced epoxy resin composites in subcritical water: Synergistic effect of phenol and KOH on the decomposition efficiency," Polymer Degradation and Stability, 97:214-220 (2012).
Extended European Search Report for EP Application No. 17778755.3 dated Nov. 25, 2019.

* cited by examiner

*Primary Examiner* — Daniel C. McCracken
(74) *Attorney, Agent, or Firm* — Foley Hoag LLP; Alexander Akhiezer; Laura A. Wzorek

(57) ABSTRACT

The present invention relates in general to recycling of polymer matrix composite. In particular, the invention relates to a process for separating reinforcement material from polymer matrix composite comprising the reinforcement material within a thermoset polymer matrix.

10 Claims, No Drawings

US 11,090,841 B2

RECYCLING OF POLYMER MATRIX COMPOSITE

RELATED APPLICATIONS

This application is a § 371 national stage application based on Patent Cooperation Treaty Application serial number PCT/IB2017/051838, filed Mar. 31, 2017; which claims the benefit of priority to U.S. Patent Application No. 62/318,555, filed Apr. 5, 2016.

FIELD OF THE INVENTION

The present invention relates in general to recycling of polymer matrix composite. In particular, the invention relates to a process for separating reinforcement material from polymer matrix composite comprising the reinforcement material within a thermoset polymer matrix.

BACKGROUND OF THE INVENTION

With an ever growing concern about the depletion of natural resources, there is a concerted effort underway to initiate programs for the recycling of consumer and industrial waste products.

While technologies have been developed for recycling many polymer based products, these have been primarily confined to non-composite thermoplastic polymer products. For example, extensive programs are now in existence for recycling polyethylene terephthalate (PET), particularly in the form of waste soft drink bottles.

Polymer matrix composites are used extensively in modern society typically in applications that require polymer product to exhibit improved properties.

Polymer matrix composites provide for such improved properties by incorporating within their polymer matrix reinforcement materials such as fibres, fabrics and/or particles.

While affording improved properties, the presence of reinforcement material within polymer matrix composites presents a number of recycling challenges. As part of a polymer matrix composite recycling process, it is often desirable to separate reinforcement material from the polymer matrix. Where the polymer matrix composite has a thermoplastic polymer matrix, separation of the reinforcement material can be achieved by taking advantage of the thermoplastic nature of that polymer matrix. For example, the thermoplastic polymer matrix can be liquefied using heat and/or a suitable solvent. Once liquefied, the reinforcement material may be separated using known techniques for the separation of solids (the reinforcement material) from liquids (the liquefied thermoplastic polymer matrix). Thermoplastic polymer matrix composites may also simply be remolded into new products as a form of recycling.

However, where the polymer matrix composite has a thermoset polymer matrix, separation of the reinforcement material from the thermoset polymer matrix is considerably more challenging. In particular, a thermoset polymer matrix is not amendable to melting on application of heat or being readily solvated by conventional solvents.

A number of techniques have nevertheless been developed in an attempt to recycle at least some of the components in polymer matrix composites having a thermoset polymer matrix.

For example, to recover reinforcement material thermoset polymer matrix composites have been subjected to pyrolysis whereby the organic polymer matrix is in effect burnt off leaving behind the reinforcement material. While successful at separating reinforcement material from the polymer matrix composite, such pyrolysis techniques are limited to composites having thermally stable reinforcement materials. This technique is also prone to leaving an undesirable char layer on the surface of the recovered reinforcement material. Furthermore, the mechanical properties of the recovered reinforcement material can in any event sometimes be adversely affected by the high temperatures employed.

Another example makes use of a so-called "cracking agent" which functions to propagate micro-cracks throughout the thermoset polymer matrix thereby facilitating fracturing of the matrix into small particles. Fracturing of the polymer matrix in this way can led to separation of the polymer matrix from reinforcement material. However, this technique becomes less effective as the dimensions of reinforcement material approach that of the dimensions of the fragmented polymer matrix (i.e. it can be more difficult to separate reinforcement material of similar size). Furthermore, due to at least the process kinetics, the technique is not well suited for commercial scale applications.

Accordingly, there remains an opportunity to develop techniques for recycling components of polymer matrix composites having a thermoset matrix which address one or more problems associated with techniques known in the art, or at least provides a viable alternative to such techniques.

SUMMARY OF THE INVENTION

The present invention therefore provides a process for separating reinforcement material from polymer matrix composite comprising the reinforcement material within a thermoset polymer matrix, the process comprising bringing into contact (i) the polymer matrix composite, and (ii) a reclaim composition comprising a phenolic compound and an acidic or basic catalyst, wherein through contact with the reclaim composition the thermoset polymer matrix (a) degrades via chain scission and becomes solubilised within the reclaim composition, and (b) consequently releases the reinforcement material into the reclaim composition.

The present invention further provides use of a reclaim composition for separating reinforcement material from polymer matrix composite comprising the reinforcement material within a thermoset polymer matrix, the reclaim composition comprising a phenolic compound and an acidic or basic catalyst.

The present invention also provides a reclaim composition when used for separating reinforcement material from polymer matrix composite comprising the reinforcement material within a thermoset polymer matrix, the reclaim composition comprising a phenolic compound and an acidic or basic catalyst.

In one embodiment, use of the reclaim composition comprises bringing into contact the reclaim composition and the polymer matrix composite.

It has now been found that polymer matrix composite comprising reinforcement material within a thermoset polymer matrix can surprisingly be degraded under relatively mild conditions using the reclaim composition to effectively and efficiently enable separation of the reinforcement material from the thermoset polymer matrix.

The process according to the invention is advantageously not limited to using as a feedstock polymer matrix composite comprising specialist thermoset polymer matrix that has been strategically designed to degrade under certain conditions. In other words, the process according to the invention can advantageously use as feedstock polymer matrix composite comprising conventional commercial thermoset polymer matrix.

According to the present invention, the reclaim composition comprising a phenolic compound and an acidic or basic catalyst promotes degradation of the thermoset polymer matrix via chain scission. By "chain scission" is meant breaking of covalent bonds that make up the molecular structure of the thermoset polymer matrix. This chain scission in turn causes the thermoset polymer matrix to degrade producing residues thereof having a molecular weight that is sufficiently low to become solubilised in the reclaim composition. Such degradation of the thermoset polymer matrix consequently releases and thereby separates the reinforcement material from the polymer matrix composite.

The separated reinforcement material can be readily isolated from the reclaim composition using known separation techniques such as filtration or centrifugation.

The isolated reinforcement material can advantageously be provided in a very "clean" state in the sense that it will be substantially free of polymer and other contaminates. Most notably, due to the relatively mild condition of the process the reinforcement material can be separated from the polymer matrix composite while substantially maintaining the physical and mechanical properties of the original reinforcement material (i.e. reinforcement material prior to being used in the polymer matrix composite). The isolated reinforcement material is therefore particularly well suited for being recycled into new applications.

The present invention further provides reinforcement material separated from polymer matrix composite according to the process of the invention.

The present invention also advantageously enables recycling of the degraded thermoset polymer component of the polymer matrix composite. According to the process, the thermoset polymer matrix is degraded and becomes solubilised within the reclaim composition. The solubilised degraded thermoset polymer matrix will be in the form of relatively low molecular weight species and can be readily isolated from the reclaim composition using a technique such as distillation or solvent extraction. The isolated degraded polymer component of the polymer matrix composite can then be recycled into new applications. Alternatively, the reclaim composition comprising the degraded thermoset polymer component of the polymer matrix composite may itself be recycled into new applications.

Another advantage afforded by the process of the invention is that it is particularly well suited for operation on a commercial scale.

Further aspects and embodiments of the invention are outlined below.

DETAILED DESCRIPTION OF THE INVENTION

The process according to the invention is for separating reinforcement material from polymer matrix composite comprising the reinforcement material within a thermoset polymer matrix.

The expression "polymer matrix composite" is intended to mean polymer comprising within its polymer matrix one or more reinforcement materials which are essentially insoluble in the polymer matrix.

The expression "reinforcement material" is intended to mean material incorporated within a polymer matrix that serves to modify the properties of the polymer matrix. The reinforcement material will be substantially insoluble in the polymer matrix and can modify the physical and/or chemical properties of the polymer matrix in a variety of ways. For example, the reinforcement material may strengthen, stiffen, toughen, and/or increase temperature or impact resistance of the polymer matrix. The reinforcement material may be provided in a variety of physical forms, for example in the form of fiber, fabric and/or particles. The reinforcement material may be in the form of a nano-material (i.e. a material having at least one dimension that is no greater than 100 nm). The reinforcement material may also be provided in a variety of chemical forms, for example it may be inorganic, organic, metallic, clay or ceramic.

Polymer matrix composite used in accordance with the invention has a thermoset polymer matrix throughout which the reinforcement material is located.

The expression "thermoset polymer matrix" is intended to mean a polymer matrix that is cross-linked forming a three-dimensional network structure. Unlike a thermoplastic polymer matrix, a thermoset polymer matrix does not melt and flow upon application of heat but instead will decompose at sufficiently elevated temperatures.

It will be appreciated that the thermoset polymer provides for the thermoset polymer matrix.

By the reinforcement material being "within a thermoset polymer matrix" or the thermoset polymer matrix "comprising the reinforcement material" is meant the reinforcement material is associated with, distributed or embed throughout the thermoset polymer matrix such that it cannot simply be separated from the thermoset polymer matrix without breaking down the thermoset polymer matrix in some way.

Examples of thermoset polymers (providing a thermoset polymer matrix) include, but are not limited to, epoxy resins, melamine formaldehyde, polyester resins, urea formaldehyde, vinyl esters, phenolic resins, cyanate esters, polyimide and maleimide resins.

In one embodiment, the thermoset polymer matrix is selected from epoxy resins, melamine formaldehyde, polyester resins, urea formaldehyde, vinyl esters, phenolic resins, cyanate esters, polyimide, maleimide resins and combinations thereof.

In another embodiment the thermoset polymer matrix is selected from epoxy resins.

In one embodiment, the reinforcement material is in a form selected from fiber, fabric, particle and combinations thereof.

Where the reinforcement material is in the form of a particle, the particle can have a variety of shapes. For example, the particle may have a spherical or rod shape.

In a further embodiment, the reinforcement material is in the form of a nano-material.

In another embodiment, the reinforcement material is in a form selected from fibre, fabric and a combination thereof.

The reinforcement material may be made from a variety of substances. For example, the reinforcement material may be inorganic, organic, metallic, clay or ceramic.

In one embodiment, the reinforcement material is made from a composition selected from ceramic, clay, metal, metal oxide, metal carbide, glass, quartz, basalt, carbon, graphite, boron, boron nitride, plant matter and combinations thereof In one embodiment, carbon-based reinforcement material is selected from carbon fiber, carbon fabric, carbon nanotubes, graphene and graphite.

In one embodiment, boron-based reinforcement material is selected from boron or boron nitride fibers and nanotubes.

In one embodiment, the reinforcement material is non-polymeric reinforcement material.

In a further embodiment, the reinforcement material is selected from carbon fiber, carbon fabric, glass fiber, glass fabric and combinations thereof.

The polymer matrix composite used in accordance with the invention incudes a thermoset polymer matrix comprising reinforcement material. Generally, the reinforcement material will be distributed throughout at least part of the thermoset polymer matrix. Due to the cross-linked structure of the thermoset polymer matrix, separating the reinforcement material from the polymer matrix composite is challenging. In particular, the thermoset (i.e. crosslinked) character of the polymer matrix prevents it from simply being melted or dissolved away from the reinforcement material.

Surprisingly, it has now been found that a thermoset polymer matrix can be effectively and efficiently degraded so as to release reinforcement material therein using relatively mild process conditions. The reinforcement material can be isolated from the polymer matrix composite in a substantially clean form and the relatively mild processing conditions advantageously enable reinforcement material to retain most if not all of its original chemical and mechanical properties.

The method according to the invention involves bringing into contact the polymer matrix composite and the reclaim composition.

The reclaim composition comprises a phenolic compound and an acidic or basic catalyst and facilities reclaiming or recycling of the reinforcement material and degraded thermoset polymer matrix residue derived from the polymer matrix composite.

By bringing "into contact" the polymer matrix composite and the reclaim composition is meant that the polymer matrix composite to be recycled is added to the reclaim composition, the reclaim composition is added to the polymer matrix composite to be recycled, or a combination of such actions, such that the reclaim composition comes into physical contact with the polymer matrix composite. The action of bringing into contact the polymer matrix composite and the reclaim composition will in practice typically occur by combining the relevant components within a reaction vessel (discussed in more detail below). Components of the reclaim composition and/or the polymer matrix composite may be introduced into such a reaction vessel separately or together.

By a "phenolic compound" is meant a compound comprising a hydroxyl group (OH) that is directly covalently bound to an aromatic ring (e.g. Ar—OH).

Examples of suitable phenolic compounds include, but are not limited to, phenol, cresols, catechol, resorcinol, hydroquinone, hydroxylbenzoic acids, nitrophenols, nitrosophenols, phenolic aldehydes, and combinations thereof.

In addition to the phenolic compound, the reclaim composition comprises an acidic or basic catalyst. By the catalyst being "acidic" or "basic" is meant that it has chemical structure that can render reclaim composition acidic (i.e. pH<7) or basic (i.e. pH>7), respectively.

The reclaim composition will be rendered acidic or basic by the respective acidic or basic catalyst being soluble within the reclaim composition. Application of heat to the reclaim composition may be required to promote solubility of the acidic or basic catalyst in the reclaim composition.

The acidic or basic nature of a catalyst can be readily determined by techniques known in the art. For example, the acidic or basic nature of a catalyst can be determined by measuring its pH.

Provided the reclaim composition is rendered acidic or basic, there is no particular limitation on the type of acidic or basic catalyst used.

Examples of suitable acidic catalysts include, but are not limited to, hydrochloric acid, acetic acid, lactic acid, formic acid, propionic acid, citric acid, methane sulfonic acid, toluene sulfonic acids, sulfuric acid, benzoic acid, phthalic acid, or combinations thereof.

Examples of suitable basic catalysts include, but are not limited to, hydroxides or carbonates of alkali metals and alkaline earth metals, ammonia, ammonium hydroxide, ammonium carbonate, analine, or combinations thereof.

Without wishing to be limited by theory, the acidic or basic catalyst is believed to facilitate chemical reactions that promote degradation of the thermoset polymer matrix.

The reclaim composition will generally comprise from 1-99 wt. % phenolic compound and from 1-50 wt. % acidic or basic catalyst, relative to the total mass of the reclaim composition.

The reclaim composition may also comprise one or more other components. For example, the reclaim composition may comprise solvent such as an organic solvent (e.g. toluene, xylene, alcohol), water or combinations thereof. In one embodiment, the solvent used is water.

In one embodiment, phenolic compound is present in the reclaim composition in an amount ranging from 20-99 wt. %, or 30-90 wt. %, or 40-90 wt. %, or 50-90 wt. %, 60-85 wt. %, or 60-75 wt. %.

In one embodiment, acidic or basic catalyst is present in the reclaim composition in an amount ranging from 5-80 wt. %, or 5-60 wt. %, or 10-60 wt. %, or 15-60 wt. %, 20-50 wt. %, or 25-40 wt. %.

In one embodiment, the reclaim composition comprises solvent in an amount ranging from 1-50 wt. %, or 1-40 wt. %, or 1-30 wt. %, or 1-25 wt. %, 1-20 wt. %, or 1-15 wt. %.

Where the phenolic compound and the acidic or basic catalyst do not make up 100 wt. % of the reclaim composition, the remaining wt. % up to 100 wt. % will generally be made up of solvent.

To maximise contact between the polymer matrix composite and the reclaim composition and facilitate degradation of the thermoset polymer matrix, the reclaim composition will generally be in liquid form.

In one embodiment the reclaim composition is a liquid reclaim composition.

Where one or more components that form the reclaim composition is solid at room temperature, that component may become liquefied by dissolving in one or more other liquid solvent components present and/or heat may be applied to the composition to convert the solid component into liquid form.

When performing the process of the invention, contact between the polymer matrix composition and the reclaim composition will generally take place within a reaction vessel.

Suitable reaction vessels will be selected so as to be substantially non-reactive with components of the reclaim composition. For example, the reaction vessel may be made of steel having an inner glass lining for containing the reclaim composition. Alternatively, the reaction vessel may be made from corrosion resistant alloys such as Hastelloy 256 or Carpenter 20.

To promote contact between the polymer matrix composite and the reclaim composition it may be desirable to stir or mix these components within the reaction vessel.

A reaction vessel containing the polymer matrix composite and reclaim composition may therefore be provided in the form of a stirred reaction vessel.

The reaction vessel may comprise one or more mechanical stirrers, for example an anchor or "H" stirrer.

The reaction vessel will typically contain one or more openings for introducing or removing the reclaim composition, the polymer matrix composite and residues derived therefrom.

The bottom portion of the reaction vessel may present a flat surface or be in the form of an inverted truncated cone.

The volume of the reaction vessel will be selected on the basis of the scale of the process to be performed. Advantageously, the process according to the present invention can be readily performed on small or large scale. For example, the reaction vessel may be selected to have a volume ranging from 50 litres to 15,000 litres.

To enhance degradation of the thermoset polymer matrix, it will generally be desirable to expose a maximum surface area of the polymer matrix composite to the reclaim composition. As the polymer matrix composite may be present in various shapes and sizes it may need to be comminuted prior to being contacted with the reclaim composition. Having said that, depending upon the nature of the reinforcement material and the intended application in which the separated reinforcement material is to be applied, a balance between comminution and maximising surface area contact of the polymer matrix composite with the reclaim composition may need to be considered. For example, where the reinforcement material is a fibre and the intended application for the separated fibre requires fibre length to be maximised, it may not be appropriate to comminute the polymer matrix composite to a degree which compromises the desired fibre length.

The polymer matrix composite may be partially or fully submerged in the reclaim composition.

The process in accordance with the invention can advantageously accommodate the polymer matrix composite in large or small pieces. For example, the polymer matrix composite may be in the form of a powder or alternatively it may present dimensions of up to 100 cm or more.

If the polymer matrix composite to be used in accordance with the invention does require comminution, this can be achieved using known techniques in the art. For example, the polymer matrix composite may be comminuted using a shredder, hammer mill, grinder or granulator.

Depending on the nature (e.g. physical form and chemical composition) of the polymer matrix composite and the nature (e.g. chemical composition) of the reclaim composition, to at least facilitate a desired degree of degradation of the thermoset polymer matrix in an acceptable time frame it may be necessary to provide heat to the reclaim composition that is in contact with the polymer matrix composite.

In one embodiment, the process comprises providing heat to the reclaim composition that is in contact with the polymer matrix composite.

In that case, the present invention provides a process for separating reinforcement material from polymer matrix composite comprising the reinforcement material within a thermoset polymer matrix, the process comprising:
(a) bringing into contact (i) the polymer matrix composite, and (ii) a reclaim composition comprising a phenolic compound and an acidic or basic catalyst; and
(b) providing heat to the reclaim composition,
wherein through contact with the reclaim composition the thermoset polymer matrix (a) degrades via chain scission and becomes solubilised within the reclaim composition, and (b) consequently releases the reinforcement material into the reclaim composition.

Providing heat to the reclaim composition can (i) assist to convert one or more components thereof into liquid form should they present in solid form, and thereby enhance contact between the polymer matrix composite and the reclaim composition, and/or (ii) enhance degradation of the thermoset polymer matrix via chain scission and subsequent solvation of degraded residues of the thermoset polymer matrix within the reclaim composition.

The present invention further provides a process for separating reinforcement material from polymer matrix composite comprising the reinforcement material within a thermoset polymer matrix, the process comprising:
(a) bringing into contact (i) the polymer matrix composite, and (ii) a reclaim composition comprising a phenolic compound and an acidic or basic catalyst; and
(b) providing heat to the reclaim composition,
wherein (i) the reclaim composition in contact with the polymer matrix composite is in liquid form, and (ii) through contact with the liquid reclaim composition the thermoset polymer matrix (a) degrades via chain scission and becomes solubilised within the reclaim composition, and (b) consequently releases the reinforcement material into the reclaim composition.

In one embodiment, the reclaim composition is heated to a temperature of at least 30° C., or at least 40° C., or at least 50° C., or at least 60° C., or at least 70° C., or at least 80° C., or at least 90° C., or at least 100° C., or at least 110° C., or at least 120° C., or at least 130° C., or at least 140° C., or at least 150° C., or at least 160° C., or at least 170° C., or at least 180° C., or at least 190° C., or at least 200° C., or at least 210° C., or at least 220° C., or at least 230° C., or at least 240° C., or at least 250° C., or at least 260° C., or at least 270° C., or at least 280° C., or at least 290° C., or at least 300° C., or at least 350° C.

In a further embodiment, the reclaim composition is heated to a temperature ranging from about 30° C. to about 350° C., or from about 70° C. to about 350° C., or from about 100° C. to about 350° C., or from about 150° C. to about 350° C., or from about 200° C. to about 350° C., or from about 250° C. to about 350° C., or from about 30° C. to about 200° C., or from about 50° C. to about 200° C., or from about 70° C. to about 200° C., or from about 80° C. to about 200° C., or from about 90° C. to about 200° C., or from about 100° C. to about 200° C.

In one embodiment, the reclaim composition comprises a basic catalyst and is heated to a temperature of from about 250° C. to about 350° C.

In a further embodiment, the reclaim composition comprises an acidic catalyst and is heated to a temperature of from about 100° C. to about 200° C.

Providing heat to the reclaim composition can be achieved using techniques know in the art. For example, the heat may be provided from a heated reaction vessel within which the reclaim composition is contained.

To facilitate degradation of the thermoset polymer matrix, it may also be desirable to perform the process under increased pressure (relative to atmospheric pressure).

In one embodiment, the process comprises providing pressure to the reclaim composition that is in contact with the polymer matrix composite.

In a further embodiment, the reclaim composition is subjected to a pressure of at least 1 bar, or at least 2 bar, or at least 3 bar, or at least 5 bar, or at least 8 bar, or at least 10 bar, or at least 15 bar, or at least 20 bar, or at least 25 bar, or at least 30 bar, or at least 35 bar, or at least 40 bar, or at least 45 bar, or at least 50 bar, or at least 55 bar, or at least 60 bar.

In another embodiment, the reclaim composition is subjected to a pressure ranging from about 1 bar to about 60 bar, or from 2 bar to about 60 bar, or from about 5 bar to about 60 bar, or from about 2 bar to about 20 bar, or from 5 bar to about 20 bar, or from about 30 bar to about 60 bar.

Subjecting the reclaim composition to increased pressure can be achieved using techniques known in the art. For example, the process according to the invention may be performed in a pressure reaction vessel.

In accordance with the invention, the thermoset polymeric matrix degrades through being in contact with the reclaim composition. Without wishing to be limited by theory, the reclaim composition is believed to swell the thermoset polymer matrix and thereby assist with ingress of the reclaim composition within the thermoset polymer matrix. The reclaim composition can then efficiently promote chain scission throughout the thermoset polymeric matrix. This chain scission in turn causes the thermoset polymer matrix to degrade producing residues thereof having a molecular weight that is sufficiently low to become solubilised in the reclaim composition. Such degradation of the thermoset polymer matrix consequently releases and thereby separates the reinforcement material from the polymer matrix composite.

Degradation of the thermoset polymer matrix may also occur via other chemical pathways such as dehydrogenation and/or hydrolysis.

Such degradation pathways of the thermoset polymer matrix are distinct from the conventional pyrolysis and "cracking" techniques used to separate reinforcement material from polymer matrix composites.

Those skilled in the art will appreciate that the inability of thermoset polymer to melt and their insolubility in solvents is primarily a result of the cross-linked structure of the thermoset polymeric matrix preventing flow or solvolysis of polymer chains that form the polymer matrix. By virtue of chain scission induced according to the process of the present invention, the thermoset polymeric matrix is fragmented into molecular segments of sufficiently low molecular weight that can be solvated within the reclaim composition. Accordingly, through chain scission the thermoset polymeric matrix becomes solubilised within the reclaim composition.

As a result of the thermoset polymeric matrix degrading and becoming solubilised within the reclaim composition, reinforcement material within the thermoset polymeric matrix is released into the reclaim composition and consequently becomes separated from the polymer matrix composite.

The process according to the invention therefore produces reclaim composition comprising solubilised molecular fragments of the thermoset polymeric matrix and dispersed or distributed reinforcement material.

The reinforcement material can advantageously be isolated from the reclaim composition using conventional separation techniques. For example, the separated reinforcement material may be isolated from the reclaim composition by filtration or centrifugation.

Where the reclaim composition comprising solubilised molecular fragments of the thermoset polymeric matrix and dispersed or distributed reinforcement material (i.e. the reclaim composition process product) happens to be solid at the temperature at which the separated reinforcement material is to be isolated from the reclaim composition, the reclaim composition process product may be heated so at to liquefy it and facilitate isolation of the separated reinforcement material.

In one embodiment, the method further comprises isolating the reinforcement material from the reclaim composition, for example by filtration or centrifugation.

The composition of molecular fragments of the thermoset polymeric matrix formed through degradation during the process will vary depending upon the type of thermoset polymer matrix of the polymer matrix composite. Such molecular fragments will typically have a composition that reflects monomer components used to form the thermoset polymeric matrix. For example, where a thermoset polymer matrix is prepared using phenolic-based monomer, the molecular fragments of the thermoset polymeric matrix formed during the process may have a phenolic composition. Although such degradation products become solubilised in the reclaim composition, they are not intended to represent part of the reclaim composition per se. In other words, the reclaim composition per se is intended to be that which is presented and used at the very start of the process and prior to any degradation of the thermoset polymer matrix taking place.

Accordingly, the reclaim composition used in accordance with the invention will comprise phenolic compound and an acidic or basic catalyst prior to any degradation of the thermoset polymer matrix taking place. The phenolic compound and acidic or basic catalyst of the reclaim composition per se are therefore not formed in situ during the process of the invention.

The process according to the invention may be performed batch wise or continuously.

In one embodiment, the process is performed batch wise. In that case, the invention provides a batch wise process for separating reinforcement material from polymer matrix composite comprising the reinforcement material within a thermoset polymer matrix, the process comprising bringing into contact (i) the polymer matrix composite, and (ii) a reclaim composition comprising a phenolic compound and an acidic or basic catalyst, wherein through contact with the reclaim composition the thermoset polymer matrix (a) degrades via chain scission and becomes solubilised within the reclaim composition, and (b) consequently releases the reinforcement material into the reclaim composition.

Those skilled in the art will appreciate that a "batch wise" process involves combing all starting feedstock components to be used in the process, for example into a reaction vessel, where they remain for the duration of the process. In contrast, a "continuous" process involves introducing feedstock components to be used in the process, for example into a reaction vessel, throughout the duration of the process. In that case, product produced from the process is also often removed, for example from the reaction vessel, during the process.

As the thermoset polymer matrix is degraded by and solvated within the reclaim composition, the reinforcement material can advantageously be isolated in a very "clean" form in the sense that it is substantially free from polymer residue and other contaminates.

Most notably, the process according to the present invention degrades the thermoset polymeric matrix under relatively mild conditions and consequently the reinforcement material can be separated from the polymer matrix composite while substantially maintaining the physical and mechanical properties of the original reinforcement material. The isolated reinforcement material can therefore be recycled into applications which demand stringent properties of the reinforcement material.

If required, after being isolated from the reclaim composition, the reinforcement material may be washed, dried and/or subjected to other down stream processing techniques.

Isolated reinforcement material derived from the process of the invention can be recycled for use in producing new polymer matrix composite products.

Having performed the process of the invention, the reclaim composition will comprise degraded residues of the thermoset polymer matrix. Advantageously, that reclaim composition can continue to be used in the process of the invention until such time as the amount of degraded residue of the thermoset polymer matrix begins to adversely interfere with the process, for example by rendering the process sluggish.

The degraded residues of the thermoset polymer matrix in the reclaim composition will typically be in the form of a mixture of relatively low molecular weight hydrocarbons that may or may not be substituted with one or more functional groups. The degraded residues can advantageously be isolated from the reclaim composition using known techniques such as distillation, solvent extraction etc. Once the degraded residues have been isolated from the reclaim composition, both the reclaim composition and the degraded residues can be recycled.

The "cleaned" reclaim composition can advantageously be recycled for use in the process according to the invention.

Isolated degraded residues of the thermoset polymer matrix derived from the process of the invention may include phenolic compounds that can be recycled for use in, for example, phenol-formaldehyde adhesive compositions.

In one embodiment, the method further comprises isolating degraded residue of the thermoset polymer matrix from the reclaim composition, for example by distillation.

Alternatively, the reclaim composition comprising the degraded thermoset polymer component of the polymer matrix composite may itself be recycled into new applications.

The process of the invention can therefore be seen to not only maximise the recycling potential of the polymer matrix composite, but it can be performed in a way that is substantially self contained. Furthermore, the process is well suited to being performed in a commercial scale.

The invention will hereinafter be described with reference to the following non-limiting examples.

EXAMPLES

Example 1

1 kg shredded carbon fiber-reinforced polymer (CFRP) with a thermoset polyimide matrix was heated in 10 l of a mixture of phenol (tech grade—which contains 10 wt. % water) with 1 kg of sodium hydroxide (reclaim composition) to 300° C. for 1 h under stirring in a stainless steel pressure vessel. Pressure of 30 bar was observed. Upon cooling, the reclaim composition was drained, the resulting separated matted fiber was pressed to remove additional reclaim composition, followed by repeated washing with acetone, followed by a water rinse. 600 g fibers were recovered upon drying. The reclaim composition comprising the degraded thermoset polymer matrix can be used directly as an additive for the manufacture of plywood glue.

Example 2

100 g shredded CFRP with a thermoset polyurethane matrix was heated to 100° C. in 2 l of a mixture of 90% phenol (tech grade—which contains 10 wt. % water) and 10% toluenesulfonic acid (reclaim composition) for 5 d in a glass flask. Pressure remained at atmospheric. The separated fiber was removed from the reclaim composition by filtration and washed with hot water. 58 g of fiber was recovered after drying.

Example 3

100 g shredded CFRP thermoset epoxy-based matrix was heated with a mixture of 250 ml Phenol (tech grade—which contains 10 wt. % water), 250 ml Aniline and 50 g potassium hydroxide (reclaim composition) in a stainless steel pressure vessel to 325° C. for 15 min.

Pressure of 60 bar was observed. Upon cooling, the reclaim composition was drained, the resulting separated matted fiber was pressed to remove additional reclaim composition, followed by repeated washing with acetone, followed by a water rinse. 61 g fiber was recovered upon drying.

Example 4

100 g shredded CFRP thermoset vinylester-based matrix was heated with 250 ml Phenol (tech grade—which contains 10 wt. % water) and 250 ml methanesulfonic acid (reclaim composition) in a stainless steel pressure vessel to 150° C. for 180 min. Pressure of 4 bar was observed. Upon cooling, the reclaim composition was drained, the resulting separated matted fiber was pressed to remove additional reclaim composition, followed by repeated washing with acetone, followed by a water rinse. 59 g fiber was recovered upon drying.

Example 5

25 g shredded glass fabric/epoxy circuit board was heated in 500 ml of 90/10 Phenol (tech grade—which contains 10 wt. % water)/TSA mixture to 95° C. for 5 days. Pressure remained at atmospheric. After cooling, the separated fiber was removed from the reclaim composition by filtration. After filtration, washing with acetone, and drying, 19.5 g of clean white glass fiber was recovered.

Example 6

20 g of Fiberite carbon fabric/epoxy overaged prepreg was cut into 1.3 cm strips and heated in 200 ml resorcinol and 100 ml TSA to 140° C. for 24 h. After filtration and three times acetone wash, 11.5 g of clean carbon fiber was recovered.

Example 7

10 g shredded carbon/epoxy rocket motor cases were heated in 100 g of 90/10 resorcinol/TSA mixture to 150° C. for 12 h. Pressure remained at atmospheric. After cooling, the separated fiber was removed from the reclaim composition by filtration. After filtration, washing with acetone, and drying, 6 g of clean carbon fiber was recovered.

Example 8

50 g shredded carbon/epoxy rocket motor cases were heated in a mixture of 125 g phenol (tech grade—which contains 10 wt. % water), 125 g cresol, 125 g resorcinol, 125 g hydroquinone, and 50 g TSA to 150° C. for 14 h. Pressure remained at atmospheric. After cooling, the separated fiber was removed from the reclaim composition by filtration. After filtration, washing with acetone, and drying, 31 g of carbon fibers were recovered by filtration.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A process for separating reinforcement material from polymer matrix composite comprising the reinforcement material within a thermoset polymer matrix, the process comprising bringing into contact (i) the polymer matrix composite, and (ii) a reclaim composition comprising (a) a phenolic compound selected from phenol, cresols, catechol, resorcinol, hydroquinone, hydroxylbenzoic acids, nitrophenols, nitrosophenols, phenolic aldehydes and combinations thereof, and (b) from 10 to 60 wt. % of an acidic catalyst selected from methane sulfonic acid, toluene sulfonic acid and a combination thereof, wherein the reclaim composition is (iii) heated to a temperature of 30° C. to 200° C., and (iv) subjected to a pressure of 1 bar to 20 bar, and wherein through contact with the reclaim composition the thermoset polymer matrix (a) degrades via chain scission and becomes solubilised within the reclaim composition, and (b) consequently releases the reinforcement material into the reclaim composition.

2. The process according to claim 1, wherein the reclaim composition is heated to a temperature of from about 50° C. to about 200° C.

3. The process according to claim 1, wherein the reclaim composition is subjected to a pressure ranging from 5 bar to 20 bar.

4. The process according to claim 1, wherein the thermoset polymer matrix is selected from epoxy resins, melamine formaldehyde, polyester resins, urea formaldehyde, vinyl esters, phenolic resins, polyurethanes, cyanate esters, polyimide resins, maleimide resins and combinations thereof.

5. The process according to claim 1, wherein the thermoset polymer matrix is an epoxy resin.

6. The process according to claim 1, wherein the reinforcement material is in the form of a fiber, fabric, particle or combination thereof.

7. The process according to claim 1, wherein the reinforcement material is in the form of a nano-material.

8. The process according to claim 1, wherein the reinforcement material is made of ceramic, clay, metal, metal oxide, metal carbide, glass, quartz, basalt, carbon, graphite, boron, boron nitride, plant matter or a combination thereof.

9. The process according to claim 1, wherein the reinforcement material is selected from carbon fibre, carbon fabric, glass fibre, glass fabric and combinations thereof.

10. The process according to claim 1, performed batch wise.

* * * * *